United States Patent [19]
Nowlin, Jr.

[11] Patent Number: 6,081,664
[45] Date of Patent: *Jun. 27, 2000

[54] METHOD FOR MONITORING A BIOS

[75] Inventor: Dan Howard Nowlin, Jr., Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/723,743

[22] Filed: Sep. 30, 1996

[51] Int. Cl.[7] .................................................. G06F 9/45
[52] U.S. Cl. .............................. 395/704; 713/2; 714/37; 714/47
[58] Field of Search ...................... 395/704, 652, 395/651, 183.12, 184.01, 183.15, 183.14; 702/119, 120; 364/280.9; 713/1, 2; 714/36, 38, 39, 47, 37

[56] References Cited

U.S. PATENT DOCUMENTS

| | | | |
|---|---|---|---|
| 5,063,496 | 11/1991 | Dayan et al. | 713/200 |
| 5,210,854 | 5/1993 | Beaverton et al. | 395/712 |
| 5,237,669 | 8/1993 | Spear et al. | 711/2 |
| 5,257,381 | 10/1993 | Cook | 709/302 |
| 5,313,616 | 5/1994 | Cline et al. | 395/704 |
| 5,367,658 | 11/1994 | Spear et al. | 711/163 |
| 5,450,586 | 9/1995 | Kuzara et al. | 395/704 |
| 5,454,086 | 9/1995 | Alpert et al. | 712/227 |
| 5,590,342 | 12/1996 | Marisetty | 713/324 |
| 5,615,331 | 3/1997 | Toorians et al. | 714/9 |
| 5,638,541 | 6/1997 | Sadashivaiah | 713/323 |
| 5,694,582 | 12/1997 | Pearce | 710/129 |
| 5,754,759 | 5/1998 | Clarke et al. | 714/37 |
| 5,850,562 | 12/1998 | Crump et al. | 713/1 |
| 5,870,606 | 2/1999 | Lindsey | 395/704 |
| 5,946,486 | 8/1999 | Pekowski | 395/704 |
| 5,949,971 | 9/1999 | Levine et al. | 395/184.01 |
| 5,953,536 | 9/1999 | Nowlin, Jr. | 713/323 |

OTHER PUBLICATIONS

"Simple Background Task Mechanism Using Timer Interrupt on a Single Task OS"; IBM Technical Disclosure Bulletin; vol. 31, No. 12, pp. 339–343, May 1989.

"Method for Monitoring Open Files for Any Application on a Personal Computer"; IBM Technical Disclosure Bulletin; vol. 29, No. 7, pp. 2996–2998, Dec. 1986.

Duncan, R, Using a DOS extender lets you start 80386 programming now. (part 2), PC Magazine v8, n17, p. 321, Oct. 1989.

Primary Examiner—Tariq R. Hafiz
Assistant Examiner—Brian Sattizahn
Attorney, Agent, or Firm—Kenyon & Kenyon

[57] ABSTRACT

A method for monitoring a basic input/output system, or BIOS, in a computer system involves intercepting a call by a software routine to access a BIOS, invoking the BIOS on behalf of the calling routine, and communicating the result of the call back to the calling routine. Intercepting a BIOS call is accomplished by establishing a false entry point to the BIOS, and providing the address of this false entry point to a calling routine in response to a request for the address of the BIOS. The calling routine will then direct subsequent BIOS service requests to the false entry point, which in turn forwards the service requests to a BIOS monitor for processing. By inserting an intermediary between the calling routine and the BIOS, usage of the BIOS can be readily monitored.

21 Claims, 2 Drawing Sheets

METHOD FOR MONITORING A BIOS

BACKGROUND OF THE INVENTION

The present invention relates generally to the field of personal computers, and in particular to a method for monitoring a basic input/output system (BIOS). The present invention is particularly well-suited for monitoring a BIOS which is accessed using selector addressing, and may be advantageously used to analyze the performance of software by monitoring their use of various BIOS routines.

In a personal computer, a BIOS handles communications between software running on the computer and devices such as CPUs, disk drives and printers. For computers running the Windows®v3.1 or Windows®95 operating system, certain BIOS routines provide mechanisms to enable software to access the BIOS in 32-bit mode. Examples of such BIOS routines are APM (Advanced Power Management) and SMB (System Management Bus).

To access a BIOS routine in 32-bit mode, the calling software must create a special 32-bit code selector for the BIOS. This requires that the software know where the BIOS 32-bit code resides in real-mode memory. This location may be determined by execution of a real-mode interrupt BIOS call, which generally also returns such information as:

real-mode segment base address of the BIOS 32-bit entry point;

offset of the 32-bit entry point;

length of code segment;

real-mode segment base address of the BIOS 16-bit code segment;

real-mode segment base address of the BIOS data segment; and length of data segment.

The calling software may then create the required 32-bit code selector using the real-mode segment base address of the BIOS 32-bit entry point and the length of the code segment. Some BIOS routines may additionally require that the calling software create a 16-bit code selector (using the real-mode segment base address of the BIOS 16-bit code segment) and/or a 32-bit data selector (using the real-mode segment base address of the BIOS data segment and the length of the data segment).

Once all of the required selectors have been built, the calling software creates a far 32-bit pointer. The far 32-bit pointer consists of a 16-bit code selector (i.e., the one allocated for 32-bit code) and the offset of the BIOS 32-bit entry point This entry point is then stored for later use in calling the BIOS routine as needed. Further details on how BIOS routines of this type are accessed can be found in *Advanced Power Management (APH) Specification* v1.2, which describes the APM software interface.

The above-described 32-bit BIOS access is beneficial in that it allows the operating system to avoid the overhead required for frequent mode switching between 32-bit and 16-bit code. On the other hand, it is extremely difficult to monitor a BIOS accessed in this manner because the BIOS is invoked through a direct call (i.e., using the far 32-bit pointer) rather than through a chained interrupt that can be "hooked" with standard methods. The ability to monitor such a BIOS, however, is highly desirable for a variety of reasons. For example, without the ability to monitor application accesses to the APM BIOS it is virtually impossible to accurately determine how effectively the software is using available power-saving tools. A significant need thus exists for a way to monitor a BIOS interface that uses 32-bit selector addressing.

SUMMARY OF THE INVENTION

The present invention provides a method for monitoring a BIOS in a computer system, and is especially useful in monitoring a BIOS accessed through 32-bit selector addressing. The general approach of the invention is to establish a false entry point, or "backdoor," through which software routines running on the computer system will access the BIOS. A BIOS monitor routine may then intercept calls to the BIOS, complete the call to the BIOS on behalf of the calling routine, and communicate the result of the BIOS call back to the calling routine. In this way, the BIOS monitor routine has the opportunity to track BIOS usage by the various software routines running on the computer system.

In an embodiment of the present invention, a BIOS monitor routine is hooked into the interrupt chain through which calls to a BIOS propagate. This enables the BIOS monitor to intercept a request to connect to the BIOS. Instead of receiving address information relating to the BIOS in response to the connect request, the calling routine will instead receive the address of the false entry point. Subsequent requests for BIOS service by the calling routine are then automatically directed to the false entry point, which in turn forwards the request to the BIOS monitor. The BIOS monitor assumes responsibility for invoking the BIOS and communicating the results of the service request back to the calling routine. In addition, the BIOS monitor is able to record information concerning the calling routine's use of the BIOS monitor and the activities of the BIOS itself The method of the present invention is highly useful because it provides a way to monitor BIOS routines that are normally accessed directly by software routines, and thus are extremely difficult to monitor. The present invention may be put to any number of practical uses, such as analyzing how efficiently particular software is using available power management resources.

DETAILED DESCRIPTION

The present invention provides a method for monitoring a BIOS, and in particular a BIOS accessed through 32-bit selector addressing. According to an embodiment of the invention, illustrated in FIG. 1, a BIOS monitor 1 intercepts all calls to a BIOS 2 by one or more calling routines 3. As explained in detail below, the calling routine 3 is essentially tricked into directing its BIOS service calls to the BIOS monitor 1, which assumes responsibility for completing the call to the BIOS 2 and returning information to the calling routine 3 as appropriate. By taking over the calls to the BIOS 2, the BIOS monitor 1 may track the manner in which the calling routine 3 uses the BIOS 2.

Figure 2:
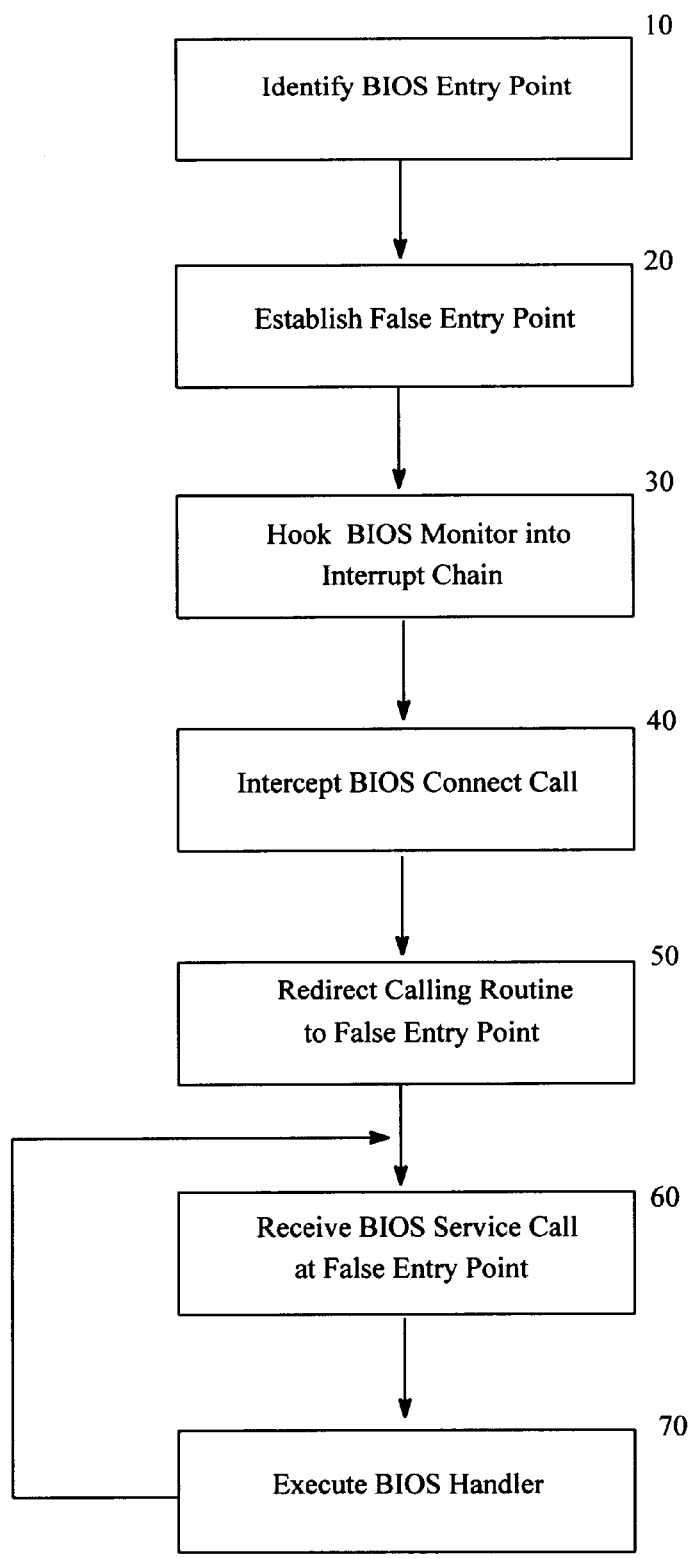
FIG. 2 is a flow chart describing the main processing for an embodiment of the present invention.

The flow chart of FIG. 2 illustrates the main processing which may be used to monitor a BIOS according to an embodiment of the present invention. In this embodiment, all of the processing shown is performed by the BIOS monitor 1, which is preferably implemented as a virtual device driver (VxD). As an initial processing step, the BIOS monitor 1 first identifies the 32-bit entry point for the BIOS 2 to be monitored (Step 10). The BIOS monitor 1 then allocates a false entry point 4, or "backdoor," to the BIOS 2. The false entry point 4 is a relatively small area of memory (approximately 20 bytes) below the 1 MB address range that includes code to call a BIOS handler 5 (Step 20). Once the false entry point 4 is established, the BIOS monitor 1 hooks itself into the appropriate interrupt chain for the BIOS 2 to be monitored (Step 30). The BIOS monitor 1 may then intercept a BIOS connect call as it passes through the interrupt chain (Step 40), and redirect the calling routine 3 to the false entry point 4 instead of the actual entry point for the BIOS 2 (Step 50). A subsequent service call to the BIOS 2 will thus be received by the false entry point 4 (Step 60), which in turn calls the BIOS handler 5 to (1) call the BIOS 2; and (2) save and/or process information relating to the call to the BIOS 2 (Step 70). These processing steps are described in further detail below.

Figure 1:
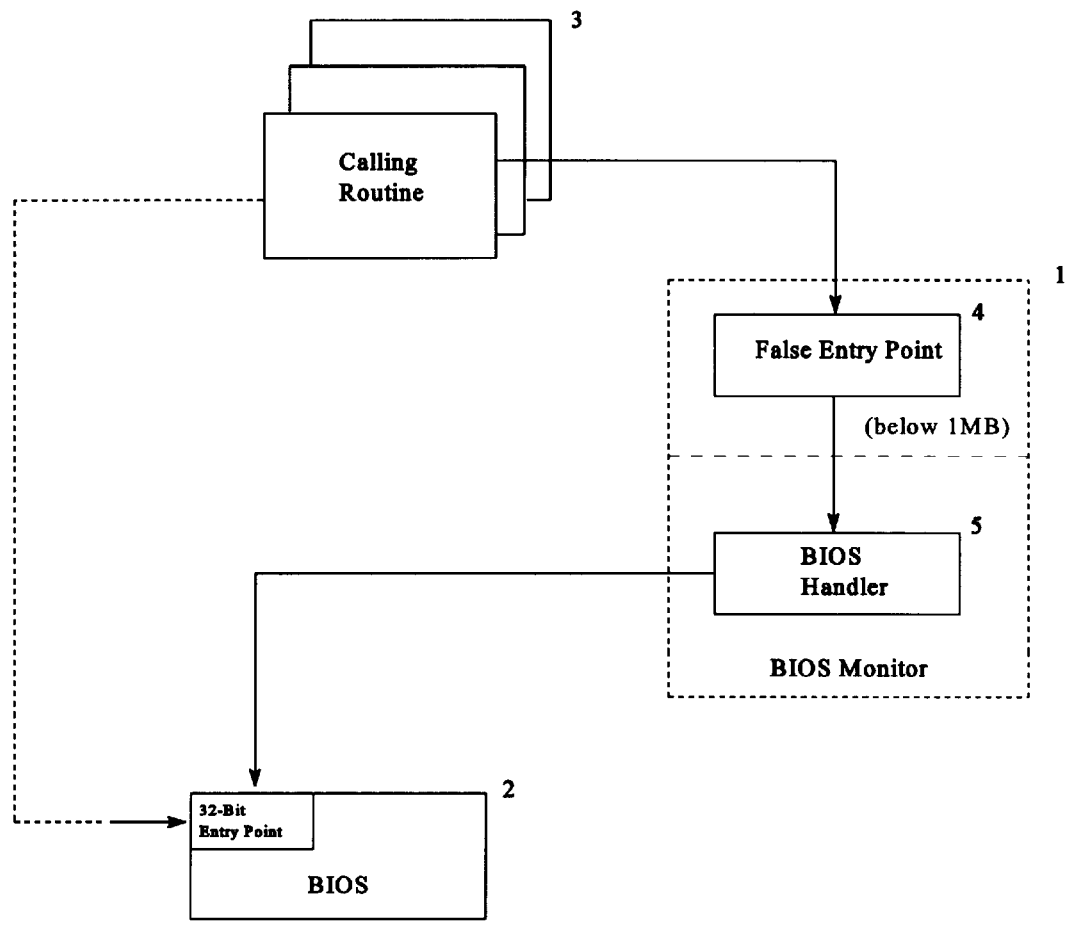
FIG. 1 is a block diagram illustrating the architecture for an embodiment of the present invention.

With further reference to FIG. 1 and FIG. 2, before the BIOS monitor 1 can intercept and execute BIOS calls, it must first determine where the 32-bit code for the BIOS 2 to be monitored resides in real-mode memory (Step 10). To do this, the BIOS monitor 1 essentially performs the same initialization procedures that a calling routine 3 would perform to "connect" to the BIOS 2. This initialization typically involves the BIOS monitor 1 executing a VMM (Virtual Machine Manager) interrupt call, passing a function code corresponding to a connect operation. In the case of the APM BIOS, for example, the interrupt call returns a real-mode segment base address of the 32-bit BIOS code segment, the offset of the 32-bit BIOS entry point, the real-mode segment address of the 16-bit BIOS code segment, and the real-mode segment address of the BIOS data segment. Once the necessary address information is retrieved from the BIOS 2, the BIOS monitor 1 uses the real-mode segment base address of the 32-bit BIOS code segment and the offset of the 32-bit BIOS entry point to determine the linear address of the 32-bit protected-mode BIOS entry point. The BIOS monitor 1 then executes a VMM allocate call, passing the linear address of the 32-bit protected-mode BIOS entry point, to create a 32-bit code selector for the BIOS 2. The BIOS monitor 1 then creates a far 32-bit pointer to the BIOS entry point using the 32-bit code selector and the offset of the 32-bit BIOS entry point. This far 32-bit pointer will subsequently be used by the BIOS handler 5 to call the BIOS 2.

Once the BIOS monitor 1 has a means for accessing the BIOS 2, it must ensure that it can detect and intercept attempts by calling routines 3, such as actual device drivers, to connect to the BIOS 2. This requires that the BIOS monitor 1 load before any of the calling routines 3 that may use the BIOS 2, which can be assured by setting an appropriately-low initialization order value within the BIOS monitor 1. In other words, the initialization order value of the BIOS monitor 1 must be lower than the initialization order value of the calling routines 3.

The BIOS monitor 1 uses the false entry point 4 to effectively trick the calling routine 3 into calling the BIOS monitor 1 instead of the BIOS 2 (Step 20). The false entry point 4 includes a relatively small amount of code whose basic function is to execute a far call to the BIOS handler 5 within the BIOS monitor 1 itself, and then execute a far return upon completion of processing by the BIOS handler 5. The false entry point 4 thus enables a call to the BIOS 2 to be re-routed to the BIOS handler 5 in a manner that is completely transparent to the calling routine 3.

Since the calling routine 3 will initially attempt to connect to the BIOS 2 using an interrupt call, the BIOS monitor 1 must "hook" the appropriate real-mode interrupt chain (Step 30). This may be accomplished, for example, by executing a VMM call to hook the BIOS handler 5 into the real-mode interrupt chain. The BIOS handler 5 is then able to detect and trap any attempt to connect to the BIOS 2.

The BIOS monitor 1 may be configured to monitor accesses to one or more BIOS routines 2, although not necessarily all of the BIOS routines 2 installed on the computer system. In the embodiment illustrated in FIG. 1, the BIOS monitor 1 intercepts and analyzes each detected interrupt to determine whether a connect call is being made to a BIOS 2 being monitored (Step 40). If a detected interrupt does not reflect such a call, the BIOS monitor 1 allows the detected interrupt to continue along the interrupt chain. On the other hand, if the detected interrupt reflects a connect call to the BIOS 2, the BIOS monitor 1, and particularly the BIOS handler 5, must service the call. Rather than returning the location of the 32-bit entry point for the BIOS 2 to the calling routine 3, the BIOS handler 5 instead returns the real-mode base segment address and offset of the code in the false entry point 4 (Step 50). The BIOS handler 5 thereby ensures that the calling routine 3 creates code selectors that point to the false entry point 4, meaning any subsequent service call by the calling routine 3 to the BIOS 2 will actually cause execution of the code fragment in the false entry point 4 (Step 60).

When the false entry point 4 is invoked, the code fragment calls the BIOS handler 5 (Step 70). The BIOS handler 5 may store information about the call in its own local storage, but in any event calls the BIOS 2 using the previously-determined 32-bit entry point. Upon completion of processing by the BIOS 2, the BIOS handler 5 may store and/or process further information relating to the call to the BIOS 2 prior to consuming the interrupt.

To avoid data corruption problems, the BIOS monitor 1 must preserve the contents of the registers found when the BIOS 2 was originally called. Likewise, after the BIOS 2 completes its processing and returns, the BIOS handler 5 must preserve the contents of any registers that were modified by the BIOS 2 itself prior to returning.

Persons skilled in the art will recognize that the BIOS monitoring method of the present invention may be advantageously used for a wide variety of practical purposes. One example of such a use is to analyze the power-management efficiency of application software, as described in the inventor's co-pending U.S. patent application Ser. No. 08/723,744 filed Sep. 30, 1996 and titled "CPU Power Monitor," the disclosure of which is expressly incorporated herein by reference.

What is claimed is:

1. A method for monitoring a BIOS accessed using selector addressing, the method comprising the steps of:
   (a) providing a false entry point in response to a request by a calling routine for an address to be used to call a BIOS;
   (b) intercepting a call to the BIOS by the calling routine, the call being directed to the false entry point;
   (c) completing the call to the BIOS on behalf of the calling routine; and
   (d) communicating completion of the call back to the calling routine.

2. The method of claim 1, wherein said step of providing a false entry point comprises hooking a BIOS monitor routine into an interrupt chain through which said request for BIOS address information is communicated.

3. A computer-readable medium containing a set of instructions for execution by a computer, the set of instructions being configured for monitoring a BIOS accessed using selector addressing, the storage medium including instructions for:

(a) providing a false entry point to a BIOS in response to a request by a calling routine for BIOS address information (b) intercepting a call to the BIOS by the calling routine, the intercepted call being directed to the false entry point;

(c) completing the call to the BIOS on behalf of the calling routine; and (d) communicating completion of the call back to the calling routine.

4. The method of claim 3, wherein said step of providing the calling routine with a false entry point to the BIOS further comprises hooking a BIOS monitor routine into an interrupt chain through which said request for BIOS address information is communicated.

5. A method for monitoring a BIOS accessed using selector addressing, the method comprising the steps of:

(a) intercepting a call to a BIOS from a calling routine by providing the calling routine with a false entry point in response to a request by the calling routine for an address to be used to call the BIOS, the intercepted call being directed to the false entry point;

(b) completing the call to the BIOS on behalf of the calling routine;

(c) detecting completion of processing by the BIOS on behalf of the calling routine; and (d) communicating completion of processing by the BIOS back to the calling routine.

6. The method of claim 5, wherein said step of providing the calling routine with a false entry point to the BIOS further comprises hooking a BIOS monitor routine into an interrupt chain through which said request for BIOS address information is communicated.

7. The method of claim 5, further comprising the step of recording information relating to the call.

8. A computer-readable medium containing a set of instructions for execution by a computer, the set of instructions being configured for monitoring a BIOS accessed using selector addressing, the storage medium including instructions for:

(a) intercepting a call to a BIOS from a calling routine by providing the calling routine with a false entry point in response to a request by the calling routine for an address to be used to call the BIOS, the intercepted call being directed to the false entry point;

(b) completing the call to the BIOS on behalf of the calling routine;

(c) detecting completion of processing by the BIOS on behalf of the calling routine; and (d) communicating completion of processing by the BIOS back to the calling routine.

9. The computer-readable medium of claim 8, wherein said instructions for providing the calling routine with a false entry point to the BIOS comprise instructions for hooking a BIOS monitor routine into an interrupt chain through which said request for BIOS address information is communicated.

10. A computer-readable medium having program routines stored thereon, the program routines comprising instructions for monitoring a BIOS routine in a computer system including a memory and an operating system, where the BIOS routine is accessible through selector addressing and is invoked by the operating system through an interrupt chain, said program routines comprising:

(a) a monitor routine including instructions for invoking the BIOS routine, said monitor routine being hooked into the interrupt chain used by the operating system to invoke the BIOS routine; and (b) a false entry point to the BIOS routine, said false entry point residing in the memory below a one megabyte address region and including instructions for invoking said monitor routine.

11. The computer-readable medium of claim 10, wherein said monitor routine includes a far pointer to a 32-bit entry point of the BIOS routine.

12. The computer-readable medium of claim 10, wherein said monitor routine includes a data store for recording information relating to a condition of the computer system.

13. A method for monitoring a BIOS accessed using selector addressing, the method comprising the steps of:

(a) intercepting a BIOS connect request made by a calling routine;

(b) returning a false entry point to the calling routine in response to the BIOS connect request, wherein said false entry point is associated with a BIOS monitor routine;

(c) receiving at said false entry point a BIOS service request made by the calling routine;

(d) forwarding the BIOS service request to the BIOS; and (e) communicating a result of the BIOS service request to the calling routine.

14. The method of claim 13, further comprising the step of hooking said BIOS monitor routine into an interrupt chain through which said BIOS connect request is passed.

15. The method of claim 14, wherein said step of hooking said BIOS monitor into an interrupt chain further comprises ensuring that said BIOS monitor is loaded prior to the calling routine.

16. The method of claim 14, further comprising the step of recording information about the BIOS service request.

17. A method for monitoring a BIOS accessed using selector addressing, said method comprising the steps of:

(a) identifying an entry point for a BIOS to be monitored;

(b) establishing a false entry point for the BIOS, said false entry point being associated with a BIOS monitor routine;

(c) intercepting a request by a calling routine to connect to the BIOS;

(d) providing the calling routine with address information relating to said false entry point in response to said intercepted request to connect to the BIOS;

(e) intercepting a request by the calling routine to invoke the BIOS;

(f) invoking the BIOS from said BIOS monitor routine in response to said intercepted request to invoke the BIOS;

(g) logging information in said BIOS monitor routine relating to said invocation of the BIOS; and (h) communicating a result of said request to invoke the BIOS back to the calling routine.

18. The method of claim 17, wherein said step of intercepting a request to connect to the BIOS further comprises hooking said BIOS monitor routine into an interrupt chain through which the request is passed.

19. The method of claim 18, wherein said step of hooking said BIOS monitor routine into the interrupt chain comprises ensuring that said BIOS monitor routine is loaded prior to the calling routine.

20. The method of claim 17, wherein said step of establishing a false entry point for the BIOS further comprises allocating an area in a memory of the computer system below a 1 megabyte address range and injecting into said area code which invokes said BIOS monitor routine.

21. The method of claim 17, wherein said step of intercepting a request to invoke the BIOS comprises receiving the request at said false entry point and executing code which invokes said BIOS monitor routine.

* * * * *